United States Patent Office 2,758,077
Patented Aug. 7, 1956

2,758,077

BENZENE HEXACHLORIDE PRODUCTION

William A. La Lande, Jr., Philadelphia, Gladys Molyneux Knorr, Meadowbrook, and Margaretta E. Aeugle, Philadelphia, Pa.

No Drawing. Original application September 6, 1946, Serial No. 695,276, now Patent No. 2,696,509, dated December 7, 1954. Divided and this application December 6, 1954, Serial No. 480,601

(Filed under Rule 47(a) and 35 U. S. C. 116)

1 Claim. (Cl. 204—163)

This invention relates to a new process for producing benzene hexachloride products unusually rich in the "gamma" isomeric form of this compound, and the products thus produced. This application is a division of our prior application Serial No. 695,276, U. S. 2,696,509, filed September 6, 1946. This case is also related to our copending application Serial No. 480,602 filed the same day as this application.

Benzene hexachloride (this term is used throughout the specification and claim to indicate any one of the isomeric forms of 1,2,3,4,5,6-hexachlorocyclohexane, as well as mixtures of the isomers of this compound) is made by addition of three molecules of chlorine to one of benzene. The resulting compound contains one chlorine atom on each carbon atom of the benzene. The benzene hexachloride product that is formed when chlorine is reacted with benzene has long been considered to be a mixture of stereoisomeric forms, the so called "alpha," "beta," "gamma," and "delta" forms having been recognized; these are stated to be present in the approximately fixed proportion of 70% of the alpha isomer, 5% of the beta isomer, 10 to 12% of the gamma isomer, and 13 to 15% of the delta isomer.

It is known in the art that this customary mixture of the benzene hexachloride isomers has insecticidal value, but that it is in only one of the isomeric forms of benzene hexachloride, namely the gamma form, that substantially all this insecticidal value resides. Even though benzene hexachloride is greatly diluted when it is compounded into insecticides, the presence of large amounts of insecticidally inactive organic materials such as the alpha and beta isomers is considered undesirable by the compounder of insecticides. Ideally, therefore, a benzene hexachloride product for compounding into insecticides should consist solely or largely of the gamma isomer.

However, it has not heretofore been commercially feasible to produce a benzene hexachloride material for insecticidal purposes containing appreciably more than the "natural" proportion of 10 to 12% gamma isomer, since the separation of even a gamma-rich product from the natural mixture of four isomers has involved the tedious and costly steps of successive resolutions and crystallizations, whereby a gamma-rich product may eventually be obtained as one of the crystallization products.

We have now discovered a process for chlorination of benzene and the recovery of the benzene hexachloride formed, whereby a gamma-rich benzene hexachloride product may be obtained from the synthesis reaction mixture. Our process involves the successive steps of (a) chlorinating benzene in a solution of benzene in carbon tetrachloride, while exposing to actinic light, whereby benzene is converted to benzene hexachloride, (b) discontinuing such chlorination when the total quantity of benzene converted to benzene hexachloride amounts to from about 10% to 60%, preferably from about 25% to 50%, of the total quantity of liquid reaction mixture, (c) separating the solid phase material which has formed, and (d) separately recovering, without further chlorination, benzene hexachloride product of reaction that remains in solution in the liquid phase material separated in the preceding step. We have found it desirable to correlate the temperature of the separation step (c) with the extent of chlorination; thus when chlorination does not go beyond the preferred limit of about 50% of the total reaction mixture, the separation step (c) is carried out at a temperature not higher than about 40° C., whereas when the extent of chlorination goes beyond about 50%, the separation step (c) is preferably carried out at a somewhat warmer temperature, say 40 to 80° C., and when the extent of chlorination does not exceed about 40%, the separation step may advantageously be carried out at about 25° C. Although it is convenient to use chlorine in gaseous form in our process, other forms, e. g., liquid chlorine, may be used.

We have found that by following the steps above outlined, the benzene hexachloride product obtained in step (d) above exhibits from 3 to 7 times the insecticidal efficacy of the products which have heretofore been recovered directly from the chlorination reaction mixture. For example, the gamma isomer concentration in the product prepared according to our invention is usually at least 20 to 30%, and may be as high as 90% or more, whereas the gamma isomer concentration in products prepared by comparable prior art processes is usually in the range of 10 to 12%. We have further found that our gamma isomer rich benzene hexachloride product is substantially free from higher chlorinated products, such as the heptachloro derivative of benzene, which might have a deleterious effect on the compounding of our product for the various applications hereinafter described.

In a preferred method of carrying out the process of our invention, gaseous chlorine is led into a solution of benzene in carbon tetrachloride, the carbon tetrachloride being substantially inert under the conditions of use; the said solution preferably containing only a minor proportion by volume of benzene. The chlorination is carried out in the presence of actinic irradiation, e. g. the irradiation emitted by an ultra-violet lamp, bright sunlight, or other source of actinic light. The introduction of chlorine is preferably carried out with cooling if necessary to maintain the mixture below about 40° to 50° C. It is important that the chlorination step be carried out in the absence of metal catalysts which produce substitution reactions, since such products are undesired impurities and decrease the yield of benzene hexachloride. Under these conditions benzene hexachloride is substantially the only chlorination product formed from the benzene. Chlorination is discontinued before the quantity of benzene chlorinated amounts to more than about one-half of the total liquid reaction mixture, on a liquid volume basis. In the case where the solution of benzene and carbon tetrachloride contains no more than a minor proportion by volume of benzene, the benzene present may of course be completely chlorinated to benzene hexachloride without departing from this limitation on the extent of chlorination.

Agitation of the reaction mixture is preferably maintained during chlorination and, after chlorination has been discontinued, the mixture is preferably further agitated and treated to eliminate unreacted chlorine. The chlorine-free reaction mixture is then cooled and maintained at a temperature not higher than about 40° C., preferably at room temperature or slightly below, while the solid phase which is formed is separated, e. g. by filtration. The separated solid represents the part of the benzene hexachloride product of chlorination that is richer in alpha and beta isomers than the whole product normally formed upon chlorination. Under the conditions described, from 50 to 75% of the whole benzene hexachloride reaction product may thus precipitate as alpha and beta concentrate.

The solution remaining after removal of the solid alpha and beta isomers contains dissolved therein substantially all of the gamma isomer formed during chlorination. This solution is now treated to recover this product, hereinafter referred to as "gamma-rich remainder product." The gamma-rich remainder product may be recovered by evaporation of the volatile solvent and any unreacted benzene.

The gamma-rich remainder product thus recovered is then preferably further processed to obtain it in a more desirable form. This may be done by chilling, preferably at a temperature of 0° to 5° C., to crystallize it at least in part. The crystallized gamma concentrate may then be separated from the residual oil (if there is any), e. g. by centrifuging. If a water or alkaline wash has been employed, these products may be dried, the solid (hereinafter called "solid gamma concentrate") by air drying and the liquid (hereinafter called "residual oil") by a solid dehydrating agent such as calcium sulfate.

All of the above products, i. e. the gamma-rich remainder product, as well as the solid gamma concentrate and residual oil, when such is obtained, are new compositions of important insecticidal value. Each of these products is a mixture of two or more benzene hexachloride isomers which may also contain by-products of the benzene chlorination process, in small amount.

The gamma-rich remainder product which, upon chilling and standing separates into two phases, solid gamma concentrate and residual oil, may itself be looked upon as an end product, as above suggested, since it may be employed directly in insecticide formulation. This product may be characterized by the following properties:

Content of all benzene hexachloride isomers, at least 85%.
From 25 to 75% crystallizes upon holding for at least 12 hours below about 5° C.
Percent insecticidal effectiveness, as compared to pure gamma isomer 20 to 90%, more usually 25 to 60%.

The above-described solid gamma concentrate of our invention is characterized by the following properties:

Content of all benzene hexachloride isomers, at least 85%.
Melting range may be from 35 to 110° C.
Melting range usually from 48 to 80° C.
Percent insecticidal effectiveness, as compared to pure gamma isomer 20 to 90%, more usually 30 to 60%.

The residual oil of our invention is characterized by the following properties:

Content of all benzene hexachloride isomers, at least 70%.
Boiling range at 3 mm. Hg 90% over within 120 to 160° C.
Percent insecticidal effectiveness, as compared to pure gamma isomer 20 to 90%, more usually 25 to 50%.

Any of the above products when solid, may be compounded into dusts, sprays, emulsions, and other insecticidal compositions in the usual manner, e. g. may be compounded into an insecticidal dust by milling together in desired proportions a mixture of a small amount of the crystal product, or a concentrated solution thereof in acetone, and a carrier such as finely divided pyrophyllite, or a finely divided clay; may be made into a spray by dissolving a small amount of the crystal product in a solvent such as xylene, toluene, or a methyl naphthalene; or may be made into an emulsion by dispersing a concentrated xylene solution of the crystal product in water with a suitable emulsifying agent such as an alkylphenoxy polyethoxy ethanol.

Any of the above products, when liquid, may also be compounded into all the customary types of insecticidal compositions. Thus, the liquid may be adsorbed on or absorbed in a comminuted solid carrier material such as pyrophyllite, or a clay, with milling, in suitably small proportions for insecticidal purposes, and the resulting product is an essentially dry, free-flowing powder. To form sprays or emulsions the liquid may, of course, be dissolved in a solvent such as xylene or toluene just as the crystalline material.

The following example is illustrative of the process of our invention:

*Example*

156 parts by weight of benzene and 1733 parts by weight of carbon tetrachloride were charged into a reaction vessel fitted with a stirrer, reflux condenser, chlorine inlet, external water spray and a mercury vapor lamp for supplying actinic light to the mixture. Chlorine gas was passed in with agitation and irradiation, and the reaction mixture was cooled to maintain the temperature below 40° C. After four hours of chlorination, 206.2 parts of solids were removed by filtration having a melting point of 145–200° C. After the sixth hour of chlorination, 99.4 parts of solids having a melting point of 120–200° C. were removed from the reaction mixture. After chlorinating for another hour, no additional solids appeared to be coming out of solution and the chlorination was discontinued, after which 10.5 parts of solids having a melting point of 180–200° C. were removed. The filtrate from the prior separation was evaporated on a steam bath until all carbon tetrachloride was removed. The oil that remained was chilled over a period of several hours and 260.3 parts of gamma concentrate were obtained. Total conversion of the benzene to benzene hexachloride was 99.3%. The gamma concentrate containing over 20% gamma isomer had a melting point of 42–110° C. and represented 44.8% of the benzene converted to benzene hexachloride.

Since many modifications are possible in the process and product of our invention as above described without departure from the scope of the invention, it is intended that the above description of our invention should be interpreted as illustrative, and the invention is not to be limited except as set forth in the claim which follow.

We claim:

A process for production of a benzene hexachloride product rich in gamma isomer that comprises dissolving benzene in carbon tetrachloride to form a solution containing no more than a minor proportion by volume of benzene, reacting the benzene in said solution, with actinic light irradiation and agitation, with an amount of gaseous chlorine sufficient to convert substantially all the benzene to benzene hexachloride, maintaining the temperature below about 40° C. during at least the greater part of the chlorination step, removing solid phase material from the resulting chlorination reaction mixture while maintaining the temperature below about 40° C. and separately recovering, without further chlorination, benzene hexachloride product of reaction that remains in solution in the liquid phase material from the preceding step, chilling the latter benzene hexachloride product to bring about partial solidification thereof, and separating a solid phase product and a liquid phase product from the chilled material.

References Cited in the file of this patent

UNITED STATES PATENTS 2,696,509     La Lande et al. _____ Dec. 7, 1954

FOREIGN PATENTS 573,693     Great Britain _____ Dec. 3, 1945
460,288     Belgium _____ Oct. 31, 1945

OTHER REFERENCES

Van der Linden, "Ber. der Deutsche Chem. Gesell.," vol. 45 (1912), pp. 231, 236.